INVENTORS
Thompson G. Bradley, &
BY Dominicus A. J. Swinkels
R. J. Wallace
ATTORNEY

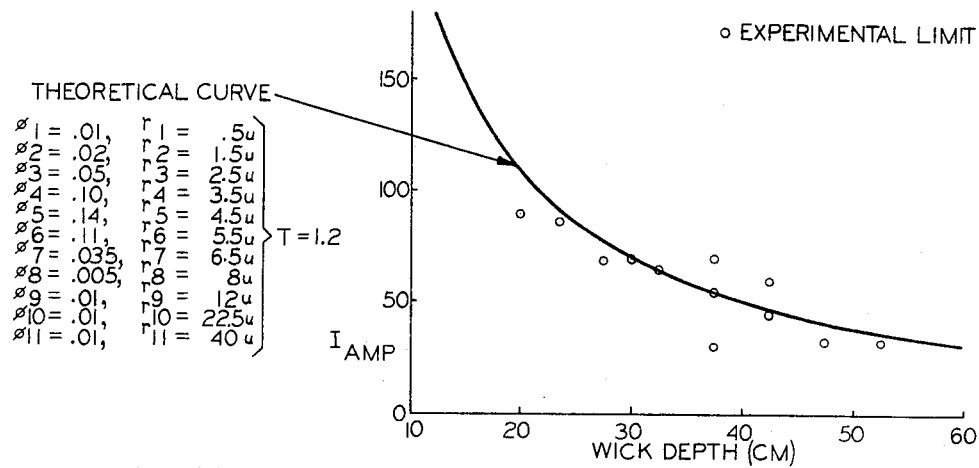
Fig. 9
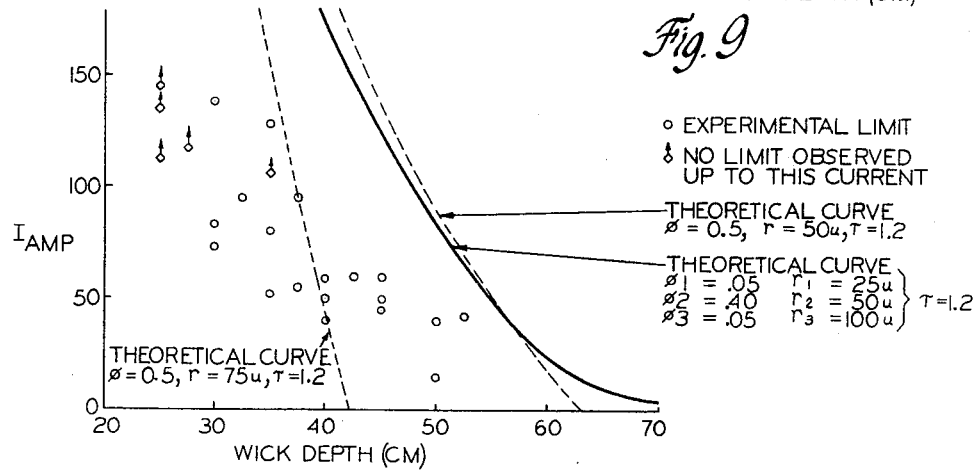
Fig. 10
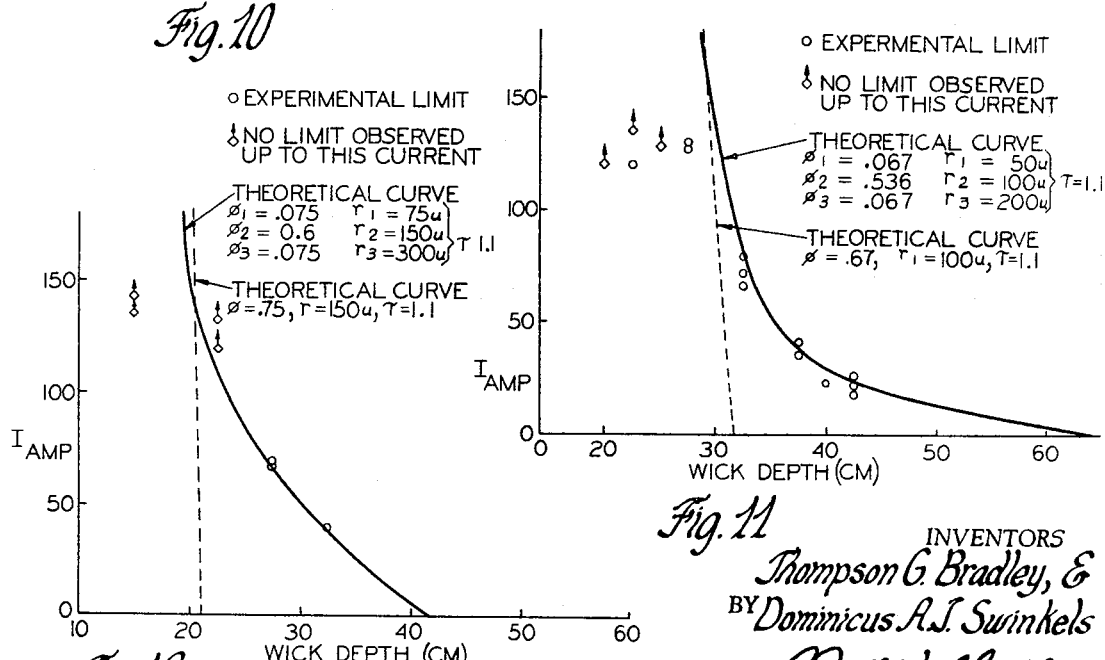
Fig. 11
Fig. 12
INVENTORS
Thompson G. Bradley, &
BY Dominicus A.J. Swinkels
R.J. Wallace
ATTORNEY

United States Patent Office

3,674,567
Patented July 4, 1972

3,674,567
ELECTROLYSIS CELL AND PROCESS USING
A WICK ELECTRODE
Thompson G. Bradley and Dominicus A. J. Swinkels, Indianapolis, Ind., assignors to General Motors Corporation, Detroit, Mich.
Original application Oct. 27, 1966, Ser. No. 590,038. Divided and this application Jan. 30, 1970, Ser. No. 871,120
Int. Cl. H01m 33/00; C22d 3/06, 3/02
U.S. Cl. 136—164          4 Claims

ABSTRACT OF THE DISCLOSURE

A combined electrode and liquid reactant transporting means for at least one liquid reactant of an electrolysis cell. A wick extends from within the cell into a liquid reactant collection reservoir. The wick is preferentially wet by the liquid reactant providing a plurality of capillary flow paths between the storage and cell regions of the system. An electrolysis process using the wick electrode is described.

---

This application is a division of application Ser. No. 590,038 entitled "Galvanic Cell System," filed Oct. 27, 1966 in the names of Thompson G. Bradley and Dominicus A. J. Swinkels and assigned to the assignee of this application.

It is, therefore, an object of our invention to provide in a galvanic cell system a combined electrode and reactant transporting means, which means conducts a liquid reactant from a remote storage region to the cell region of the system and in the cell region functions as the electrode for the thus conducted reactant.

It is a still further object of our invention to provide a process for discharging and recharging a galvanic cell system having a combined reactant transporting and reaction interface fixing means between a remote reactant storage region and the cell region of the system.

It is a still further object of our invention to provide an improved module design for a galvanic cell system which module integrates the principal components of the system into a unitized assembly which has excellent heat transfer characteristics and which provides a simple but effective liquid reactant capillary flow path for the transfer of the reactant to and from the cell region of the system.

These and other objects of our invention will become more apparent from the detailed description which follows.

Briefly stated, our invention comprehends a combined electrode and reactant transporting means for a galvanic cell system and an improved module design for the system. The invention is embodied principally in a porous conductive material which has a wetting affinity for a liquid reactant i.e., oxidant on reductant and which communicates a remote liquid reactant storage region with the cell region of a fuel cell system. We refer to our invention as a "wick electrode." The wick electrode is comprised principally of two portions which are preferably, though not necessarily, formed from a single piece of porous material. The material is preferably electrically conductive, but need not be if its associated reactant is itself conductive. One of the portions is located in the cell region of the system and actually performs the function of an electrode by supporting the liquid reactant in the cell in a fixed relationship to a counterelectrode and serving as the situs of the electrochemical reaction between the liquid reactant and the electrolyte. The other portion is merely an extension of the electrode portion and is comprised of a similar material. This latter portion extends from the electrode portion, into a liquid reactant storage region or reservoir which is removed from the cell. Owing to the preferred wetting by the liquid reactant, the entire wick including both portions is saturated to a degree dependent on the length of wick and its relation to gravitational forces. By capillary action the reactant will be transported down, up, or laterally through the wick, as appropriate, yet be held therein in a spaced relationship to the counterelectrode until electrochemically consumed from the electrode portion upon cell discharge. Upon discharge the capillary forces in the wick serve to transport additional reactant from the remote storage region to the electrode portion of the wick, hence providing more reactant to the cell region and maintaining the electrochemical reaction situs. As the reactant is electrochemically consumed, it is replaced by the additional reactant moving through the wick to fill the voids. On recharge the exact opposite of the foregoing occurs and the reactant is transported in the reverse direction back through the wick and into the storage region after plating out onto the wick.

FIGS. 9–12 show plots comparing the theoretical current obtainable to the actual current obtained for several stainless steel electrodes in a Li-LiCl environment.

Figure 1:
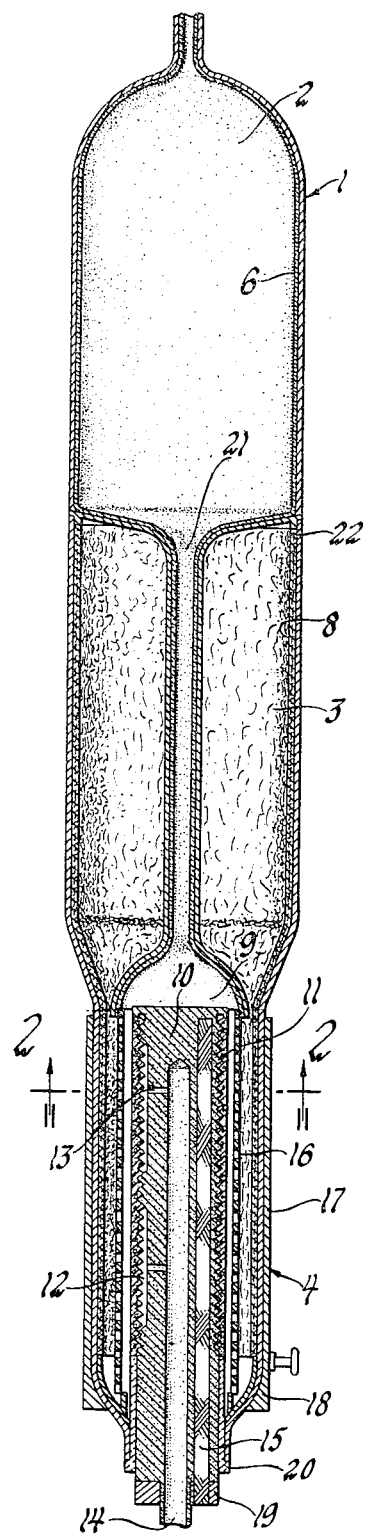
FIG. 1 shows a front sectional elevation of one embodiment of a device employing our invention.
Figure 2:
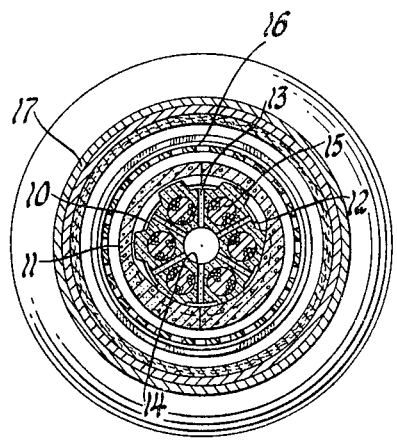
FIG. 2 shows a view of the device shown in FIG. 1 taken along section line 2—2.

FIG. 1 shows a sectional view of a preferred system employing the wick electrode of our invention. FIG. 1 shows a module designed for use in conjunction with a fuel cell system wherein the fuel is lighter than the electrolyte and more specifically for a Li/LiCl/Cl$_2$ fuel cell in which the Li is a reductant, the LiCl an electrolyte and the Cl$_2$ an oxidant. The module shown here comprises a pressure vessel or container 1 which houses in its upper portion the LiCl and Li storage regions 2 and 3, respectively. The Li storage region on reservoir 3 is an annular chamber contained within the lower half of the upper portion of the pressure vessel 1. A passage 21 formed by the inner annulus of the Li storage chamber 3 extends through the Li chamber 3 and communicates the cell region 4 with the LiCl storage region 2. In the cell region 4, which is in the lower portion of pressure vessel 1, the electrochemical consumption or dissociation takes place, as appropriate, to discharge or recharge, respectively. The upper portion of pressure vessel 1 and passage 21 are coated with an impervious ceramic coating 6. The impervious ceramic coating 6 serves two functions. The first function is the protection of the metal walls of the vessel from corrosive chemical attack. The second function is to provide a surface which is readily wet by the molten LiCl. A wick electrode 8 extends from within the Li storage chamber 3 into the cell region 4 thereby communicating by a flow path the one with the other. In the cell region 4 the wick electrode 8 functions as the anode. A Cl$_2$ counterelectrode 11 comprised of porous graphite is affixed to and supported by a dense graphite center member 10. The dense graphite center member 10 has an axially extending Cl$_2$ inlet 14. Cl$_2$ from the inlet 14 flows through the Cl$_2$ ports 13 to the annular passage 12 between the dense graphite 10 and the porous graphite electrode 11. A Cl$_2$ separator 16, which may be a screen comprised of a material which is inert to the attack of the cells constituents, is placed between the $Cl_2$ electrode 11 and Li wick electrode 8. The separator 16 effectively prevents the migration of any excess $Cl_2$, which bubbles through the porous graphite electrode 8, from chemically combining with Li. A copper sheath 17 is formed about the cell region 4. The lower portion 18 of sheath 17 is thicker than the rest of the sheath and serves as the Li electrode terminal. The copper sheath serves to more efficiently gather the current from the wick electrode and pressure vessel 1 while additionally serving as a heat sink. Stranded copper conductors 15 extend into the dense graphite center member 10 and like the copper sheath 17 serve to more efficiently gather and collect the current generated at the $Cl_2$ electrode 11. A copper disk 19 at the base of the dense graphite center member 10 is connected to the stranded copper conductors 15 and serves as a $Cl_2$ electrode contact. Ceramic insulators 20 serve to electrically isolate the anode from the cathode lest the cell be shorted out.

When fully charged, the storage region or reservoir 8 is full of lithium, the wick saturated with lithium and the cell region 4 full of electrolyte. To activate, the cell is heated to fuse the otherwise solid materials, chlorine admitted to the electrode 11 and an external circuit closed. As the lithium is consumed at the wick electrode, the volume of lithium in storage region 3 is reduced. Concurrently, the volume of lithium chloride increases. The volumetric rate of production of LiCl is almost twice the volumetric rate of depletion of the lithium. Therefore, via the open bottom of storage region 3, a portion of the LiCl replaces the Li lost from storage region 3. The balance of the LiCl formed fills the LiCl storage region 2 via passage 21. It should be noted then that for computation purposes the value $h$, for the height of the wick, must be considered from the furthest point (i.e., 22) from which reactant must be transported during the discharge of the cell.

Figure 3:
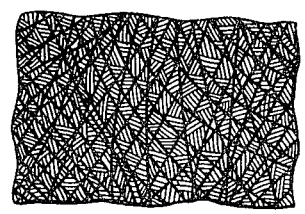
FIG. 3 shows an illustration of one material used in conjunction with our invention.

FIG. 3 shows a graphic illustration of one of the preferred materials used for the wick electrode 8. The material illustrated is fibermetal. It was purchased from Huyck Co. The fibermetal is comprised of compressed and sintered randomly oriented metallic fibers. The fibers range from 0.0004″ to about 0.010″. Almost any combination of fiber size, porosity and pore size to solve particular cell requirements could be fabricated from fibermetal, as will hereinafter be explained in detail.

Figure 4:
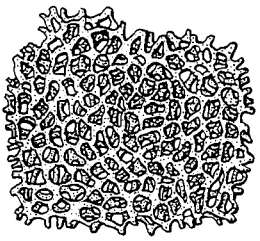
FIG. 4 shows an enlarged illustration of another material used in conjunction with our invention.

FIG. 4 is an illustration of another type of material for use as a wick electrode. FIG. 4 is a magnification of another material which is the product formed from the process of metallizing (e.g., nickel) a porous substrate such as a foam. If desired, the substrate may be subsequently removed leaving only the metallic residue which has taken on the structure of the substrate.

Two features of the wick electrode of our invention which are significant in terms of cell design are the maximum depth to which liquid reactant will wick against gravity and the rate at which it will wick to various depths. The depth, of course, is significant because it determines the amount of wick available as the electrode portion for a given head of reactant and electrolyte. The rate of flow is significant because it determines how much current can be supported by a given height, depth, or lateral length of wick.

The maximum or theoretical vertical depth to which a liquid reactant will wick is found by equating the surface tension forces and the hydrostatic forces for a capillary. For a cylindrical capillary, the maximum depth ($h$) may be represented by the equation $$h_o = \frac{2\sigma \cos \theta}{rg \Delta \rho} \quad (1)$$

where $h_o$ = maximum depth in cm.
$\sigma$ = reactant-electrolyte interfacial tension (dynes/cm.)
$\theta$ = contact angle
$r$ = pore radius (cm.) at interface
$g$ = 981 cm. sec.$^{-2}$
$\Delta \rho = \rho_E - \rho_R$ ($\rho$ = density of material)

When the electrode material is preferably wet by the reactant to a high degree such that $\theta$ approaches zero and $\cos \theta$ approaches 1, the aforesaid equation reduces to $$h_o = \frac{2\sigma}{r \, 981 \, \Delta \rho} \quad (2)$$

The rate at which the liquid reactant flows through a cylindrical pore is calculated using Polseville's equation.

$$V = \frac{r^2 \Delta P}{8 \mu l} \quad (3)$$

where $V$ = velocity of flow (cm./sec.)
$\Delta P$ = pressure difference acros the tube.
$\mu$ = viscosity of reactant (poise)
$l$ = length of tube (cm..)
$r$ = radius (cm.)

For a cylinder under zero gravity conditions the equation is:

$$\Delta P = \frac{2\sigma}{r} \quad (4)$$

For a cylinder under normal gravity conditions the equation is:

$$\Delta P = \frac{2\sigma}{r} - \eta h \Delta \rho \quad (5)$$

where $h$ = the difference in level or depth of wicking.

Consistent with the foregoing, the rate at which a reactant will wick to various depths is calculated by $$\omega = V_M \rho_R \quad (6)$$

where $\omega$ = mass flow rate of reactant g. cm.$^2$/sec.
$M$ = porosity of wick By appropriately combining Equations 3, 5 and 6 and substituting $\tau h$ for $l$, the mass flow rate of reactant through the wick is calculated by $$\omega = \frac{m \rho_R r^2}{8 \mu \tau h} \left( \frac{2\sigma}{r} - gh \Delta \rho \right) \quad (7)$$

where $\tau$ = tortuosity of the poise
$\omega$ = mass flow rate of reactant in gram cm.$^2$/sec.

For a horizontal wick or under 0 gravity conditions, Equation 7 simplifies to $$\omega = \frac{r \sigma \rho_R m}{4 \mu \tau h'} \quad (8)$$

where $h'$ = the length of the wick.

Figure 5:
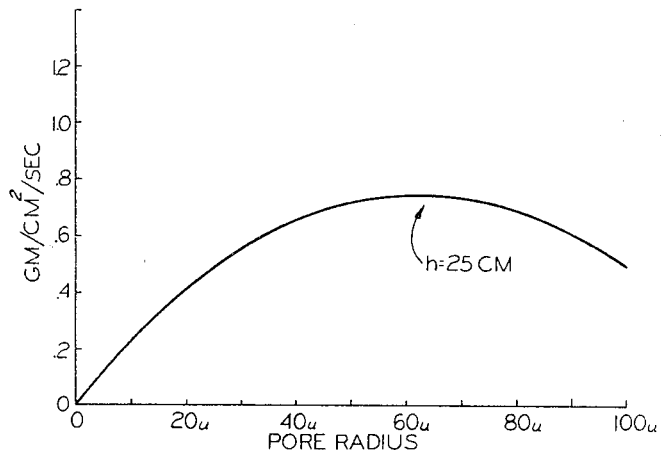
FIGS. 5 and 7 show a plot of the flow rate of lithium (Li) into lithium chloride (LiCl) through stainless steel as a function of pore size and depth.
Figure 6:
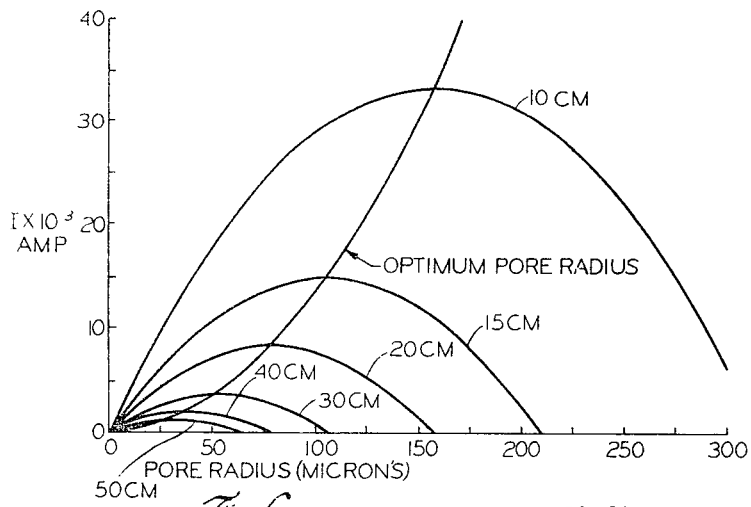
FIGS. 6 and 8 show a plot of the current which could be supported by Li in LiCl as a function of pore size and depth.
Figure 7:
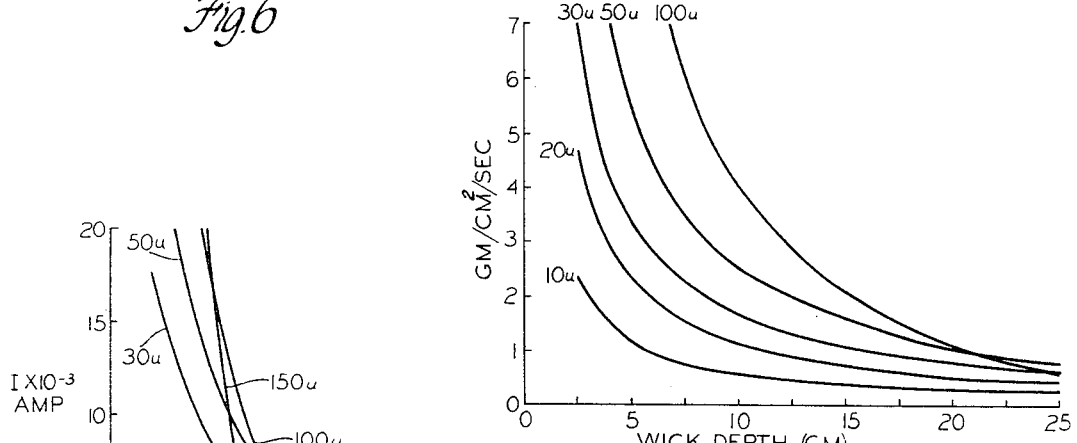
Figure 8:
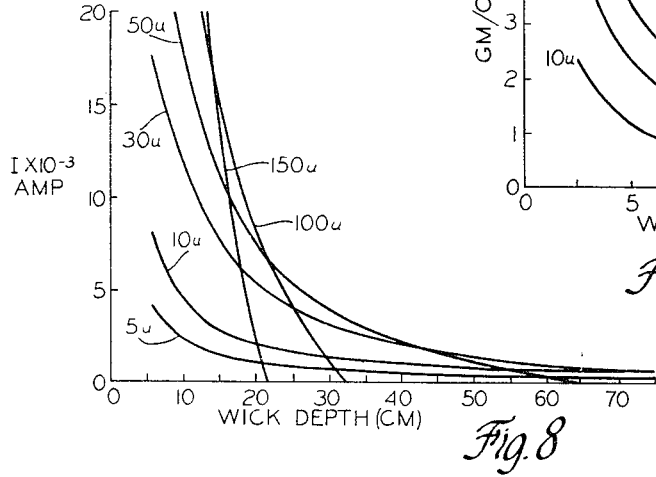

To obtain the limiting current which can be supported by a wick having a cross sectional area (A) the following equation is applicable $$I = \frac{F}{\text{Equiv. Wt.}} \cdot \frac{m \rho_R r^2}{8 \mu \tau h} \cdot A \cdot \left( \frac{2\sigma \cos \theta}{r} - ngh \Delta \rho \right) \quad (9)$$

where
$F$ = Faraday constant—96490 coulombs/equivalent
$M$ = porosity
$\rho_R$ = density of reactant
$r$ = pore radius
$\mu$ = viscosity of reactant
$\tau$ = tortuosity of the wick
$h$ = wick depth
$\sigma$ = interfacial tension reactant-electrolyte
$\theta$ = contact angle between reactant and the wick material in the presence of the electrolyte $n$ = number of times normal gravity
$g$ = acceleration due to gravity—981 cm. sec.$^{-2}$
$\Delta\rho$ = difference in density between reactant and electrolyte For an example of data from one particular system employing our invention, see FIGS. 5–12. This is a system where the liquid reactant is substantially immiscible with and has a specific gravity lower than the electrolyte. FIG. 7 shows a plot of $$\frac{w}{\omega_T} \text{versus } h$$

for Li in a Li/LiCl/Cl$_2$ fuel cell for various wick pore sizes. FIG. 5 shows that for a given depth $h$ of wick electrode there is an optimum pore radius ($r_{opt}$). For pores smaller than the optimum pore size, viscous flow is the limiting factor while for pores larger than small optimum, the surface tension driving force ($\Delta P$) is the limiting factor. Similarly, the limiting current supportable by a molten lithium reactant in a Li/LiCl/Cl$_2$ fuel cell may be computed by inserting as appropriate the variable values for porosity, pore size, depth of wick and tortuosity, the other values remaining substantially constant.

To illustrate our invention, molten Li was used as the liquid reactant and fused LiCl as the electrolyte. The test was conducted at 650° C. The wick material was a stainless steel randomly oriented interlocked structure of metallic fibers compressed and sintered to produce bonds at points where the fibers touch. This material might generally be described as fibermetal. Such material is sold under the trademark Feltmetal sold by Huyck Corporation. Hereafter when the generic term fibermetal is referred to and described, it will be in terms of Huyck Corporation's classification systems. Fibermetal comes in a variety of materials including iron, nickel, cobalt, copper, precious metals and their alloys. We prefer to use stainless steel, but do not intend to limit ourselves thereto. For computation purposes, the following values were used:

$F$ = 96490 coulombs/equivalent of Li (equivalent weight of lithium = 6.94 grams/equivalents)
$\rho_{Li}$ = density of lithium 0.469 gm./cm.$^3$
$\mu$ = viscosity of lithium—3.03 × 10$^{-3}$ poise
$\sigma$ = interfacial tension Li—LiCl—157 dynes/cm.
$\theta$ = contact angle between Li and the wick material in the presence of LiCl. (Known to be small, but for calculation purposes taken to be 0.)
$\Delta\rho$ = density difference between LiCl and Li
$\rho_{LiCl} - \rho_{Li}$ = 1.484 − 0.469 = 1.015 gs./cm.$^3$ Into Equation 9 were added the variable values of porosity, pore radius, tortuosity and wick depth as appropriate for the particular test sample. Equation 9 was used to calculate the theoretical current which could be supported by the wick material tested. The results of these calculations are found in FIG. 6 and 8 where the theoretical current which is supportable by the Li flux is shown as a function of the pore radius and wick depth. It is noted that for any depth there is a pore radius ($r_{opt}$) for which the current is a maximum. By taking small $dI/dr$ increments of Equation 9, it is found that $$r_{opt} = \frac{\sigma \cos \theta}{ngh\Delta\rho} \quad (10)$$

The curve corresponding to Equation 10 is shown on FIG. 6.

To determine the maximum flow rate attainable at each wick depth, the polarization characteristics of the wick were continually monitored. When the polarization of the electrode increased rapidly or otherwise drastically deviated from a linear E-I curve, it indicated that the Li was not flowing fast enough to support the current.

FIGS. 9, 10, 11 and 12 represent comparisons between the actual data obtained from tests and the theoretical data computed from Equation 9. Each theoretical curve is labeled with the variables used in its calculation. These variables represent the pore size distribution within a wick which nominally has only one pore size. This distribution was obtained by test with a porosimeter or from the manufacturer as appropriate. In some cases, no limiting currents were observed at the wick depth tested. These points have been plotted in FIGS. 10, 11 and 12 and are shown as diamonds with vertical arrows pointing toward infinite currents. The tortuosity of the fibermetal was estimated by extrapolating from the data of Winsauer et al. Bulletin of the American Association of Petroleum Geologists, 36, 253 (1952) who derived the formula $$\tau = 0.765 M^{-0.65} \quad (11)$$

for sand having porosity ranges 0.06–0.4.

Inasmuch as the fibermetal samples had porosities of greater than 0.4, the tortuosities used in the calculations were obtained by extrapolating Equation 11 to a tortuosity of one (1) at a porosity of one (1) and interpolating from the resultant curve.

FIG. 9 compares the results obtained from a fibermetal sample comprised of 347 stainless steel A30 fibers. The fibers had a diameter of 20 microns. The test sample had a porosity of 0.5, a nominal pore radius of 5 microns and a cross sectional area of 0.12 cm.$^2$. The theoretical I-$h$ curve was calculated using the 11 pore radius-porosity combinations indicated on the chart. This pore size distribution was measured experimentally using a Hg porosimeter. The encircled points represent the data actually obtained from a wick having a cross sectional area of 0.12 cm.$^2$.

FIG. 10 compares the results obtained from a fibermetal sample comprised of 347 stainless steel C38 fibers. The fibers had a diameter of 0.004 inch. The test sample had a porosity of 0.5 and a nominal pore radius of 50 microns. According to the manufacturer, a nominal pore size of X microns has the meaning that 80% of the pores lie between $$\frac{X}{2 \text{ microns}} \text{ and } 2X \text{ microns}$$

Therefore, as an approximation of the pore size distribution used to calculate the theoretical curves in this figure and also FIGS. 11 and 12, the following distribution was assumed:

$$10\% @ \frac{X}{2 \text{ microns}}$$

$$80\% @ \frac{X}{X \text{ microns}}$$

$$10\% @ 2X \text{ microns}$$

Also shown on FIG. 10 are the theoretical curves (dashed) for phantom samples having a single pore size of either 50 microns or 75 microns. Hence for the phantom calculations, no pore size distribution was considered. There is no explanation why this particular test did not show the same excellent agreement between the experimental points and the theoretical computations as did the other tests (see FIGS. 9, 11 and 12). However, the same general trend toward lower currents at greater depths is nonetheless apparent.

FIG. 11 depicts similar information developed for fibermetal having 0.004 inches diameter C38 fiber comprised of 347 stainless steel. The sample had a porosity of 0.67 and a nominal pore radius of 100 microns. Excellent agreement between the theoretical curve and the experimental points was noted.

FIG. 12 is data from still another test conducted using fibermetal employing C38 fibers of 347 stainless steel. The fibers had a diameter of 0.004 inch. This sample had a porosity of 0.75 and an nominal pore radius of 150 microns. Again, as in FIGS. 9 and 11, the excellent agreement between experimental data and theoretical data was noted.

FIGS. 11 and 12 demonstrate the importance that must be placed on the consideration of pore size distribution in making the calculations. It can be seen that for substantial agreement between theory and experiment, this factor must be considered. FIGS. 11 and 12 illustrate this in terms of the differences between the theoretical curve based on a pore size distribution and the theoretical curves based on single pore sizes.

While we have disclosed our invention primarily in terms of a preferred embodiment thereof, we do not intend to be limited thereby except as defined in claims which follow.

We claim:

1. A process for recharging a galvanic cell in which at least one of the components of said cell's oxidant-reductant electrochemical couple is a liquid, said process comprising the steps of:

providing said cell with an electrode for said liquid, a counterelectrode for the other component of said couple, an electrolyte between said electrodes and wick means for transporting said liquid out of said cell, which wick means is preferentially wetted by said liquid and comprises a first conductive portion in said cell corresponding to said electrode for said liquid and a second portion extending from said first portion out of said cell to a means for collecting said liquid;

impressing an electrolyzing potential on and passing electrolyzing current through said electrodes;

electrochemically dissociating said electrolyte in said cell to form said liquid at said first portion;

transporting the thus formed liquid by capillary action through said wick out of said cell to said collection means; and storing said liquid in said collection means for subsequent consumption within said cell upon discharge thereof.

2. A process for recharging a high temperature galvanic cell in which at least one of the components of the cell's electrochemical couple is a liquid metal electrolytically obtainable from the cell's electrolyte, said process comprising the steps of:

providing an electrolyte containing an ionic species of the liquid metal;

contacting the electrolyte with a wick-electrode for the liquid metal and a counterelectrode for the other component of the couple, the wick-electrode comprising first and second porous portions preferentially wetted by the liquid metal for respectively capillarily collecting the liquid metal in the cell and transporting it out of the cell to a means for storing the liquid metal;

impressing an electrolyzing potential on and passing an electrolyzing current through the electrodes to electrochemically convert the ionic species to its corresponding liquid metal at the wick-electrode;

transporting the thus formed liquid metal by capillary action through the wick out of said cell to the collection means; and storing the metal in the collection means for subsequent consumption within the cell upon discharge thereof.

3. A process for the electrolytic recovery of metal from a fused-electrolyte comprising the steps of: heating an electrolyte containing an ionic species of the metal to be recovered to a temperature above which both the electrolyte and the metal are liquid; contacting the liquid electrolyte with a wick-electrode for the liquid metal, and a counterelectrode, the wick-electrode comprising a porous, liquid-metal-wetted first portion for collecting the liquid metal from the electrolyte and a porous liquid-metal-wetted second portion extending from the first portion for transporting the liquid metal out of the cell to a means for collecting the liquid metal; impressing an electrolyzing potential on, and passing electrolyzing current through, the electrodes to electrochemically convert said ionic species in the electrolyte to its corresponding liquid metal at the first portion; and transporting the thus formed liquid metal by capillary action through said wick out of the electrolyte to the collection means.

4. An electrolysis cell for the electrolytic recovery of liquid metal from a fused electrolyte containing the metal, said cell including: an electrolysis zone having an electrode for electrolytically generating the liquid metal, a counterelectrode and an electrolyte region between the electrodes containing the electrolyte in contact with the electrodes; an electrolysis-free zone having collection means remote from the electrolysis zone for receiving the liquid metal generated at the electrode; a porous, wick-like, liquid-metal-wetted, liquid-metal-transporting member extending from within the electrolyte region to the collection means and comprising, a first conductive portion in the electrolyte corresponding to the liquid metal's electrode and a second portion extending from the first portion to the collection means to continuously capillarily convey liquid metal from the first portion to the collection means; and means for applying electrolyzing current to the electrode and counterelectrode.

References Cited

UNITED STATES PATENTS

| 3,061,537 | 10/1962 | Yagishita | 204—275 |
|---|---|---|---|
| 1,793,136 | 2/1931 | Roth | 204—255 |
| 3,118,827 | 1/1964 | Eckert et al. | 204—68 X |

ALLEN B. CURTIS, Primary Examiner

U.S. Cl. X.R.

204—68, 245

PO-1050
(5/69)

UNITED STATES PATENT OFFICE
CERTIFICATE OF CORRECTION

Patent No. 3,674,567        Dated July 4, 1972

Inventor(s) Thompson G. Bradley and Dominicus A. J. Swinkels

It is certified that error appears in the above-identified patent and that said Letters Patent are hereby corrected as shown below:

Column 1, line 30, insert as the second paragraph:

"In fuel cells, electrode design is often the most critical design factor that must be considered. Electrode design alone often determines the size, weight, configuration and heat transfer characteristics of the final cell package. Additionally, the fuel cell system designer must consider appropriate means for transporting reactant from a storage region which is removed from the cell to that reactant's associated electrode for ultimate electrochemical consumption within the cell. In the past a variety of independent mechanical devices have been provided to transport the reactant. By our invention, we provide an electrode which includes its own reactant transport means and which permits the design of cells having excellent heat transfer characteristics whereby significantly improved cell and system design can be affected. Our invention permits the design of cells having short heat paths between the situs of the electrochemical reaction and the outer walls of the cell about which is circulated the temperature controlling medium."

Column 1, line 56, insert "(" before --i.e.--; "on" should be --or--; and insert ")" after --reductant--.

Column 2, line 46, "on" should be --or--.

Column 3, line 21, "8" should be --3--.

Column 5, line 10 "$\frac{W}{M_t}$ versus h" should be --$\frac{W_T}{M}$ versus h--.

Signed and sealed this 13th day of March 1973.

(SEAL)
Attest:

EDWARD M. FLETCHER, JR.
Attesting Officer

ROBERT GOTTSCHALK
Commissioner of Patents